US006918736B2

(12) United States Patent
Hart et al.

(10) Patent No.: US 6,918,736 B2
(45) Date of Patent: Jul. 19, 2005

(54) METHOD AND APPARATUS FOR STACKING DISCRETE PLANAR OBJECTS

(75) Inventors: Colin R. Hart, Klive, IA (US); Kenneth M. Welborn, Charlottesville, VA (US); Steve N. Tomlin, Waynesboro, VA (US); Matthew Peterson, Chincoteague Island, VA (US)

(73) Assignee: F.R. Drake Company, Waynesboro, VA (US)

( * ) Notice: Subject to any disclaimer, the term of this patent is extended or adjusted under 35 U.S.C. 154(b) by 441 days.

(21) Appl. No.: 10/143,845

(22) Filed: May 14, 2002

(65) Prior Publication Data

US 2003/0007859 A1 Jan. 9, 2003

Related U.S. Application Data

(60) Provisional application No. 60/290,342, filed on May 14, 2001.

(51) Int. Cl.$^7$ .............................................. B65H 31/30
(52) U.S. Cl. .................... 414/790; 414/788.9; 414/789; 414/794.6
(58) Field of Search ............................ 414/790, 788.9, 414/789, 790.1, 791.1, 794.6

(56) References Cited

U.S. PATENT DOCUMENTS

| | | | |
|---|---|---|---|
| 3,107,912 A | * | 10/1963 | Fiehl .......................... 271/215 |
| 3,593,624 A | | 7/1971 | Dufour |
| 3,641,735 A | | 2/1972 | Daily et al. |

(Continued)

OTHER PUBLICATIONS

U.S. Appl. No. 10/143,861, Hart et al.

Primary Examiner—Douglas Hess
(74) Attorney, Agent, or Firm—Liniak, Berenato & White, LLC

(57) ABSTRACT

A system for forming a plurality of discrete objects into a stack is disclosed which system includes a frame having a top, a bottom and sides; a conveyor associated with the frame and having an end edge for dispensing discrete objects, a first support mounted on the frame near the end edge for receiving objects from the end edge and having an opening with a width smaller than the width of the objects, a first actuator operably connected to the first support for moving the first support between first and second positions relative to the end edge; a second actuator operably connected to the first support for moving the first support between upper and lower positions relative to the frame; a second support mounted on the frame beneath the first support having a width less than the width of the opening in the first support; a third actuator operatively connected to the second support for moving the second support between high and low positions, the second support high position being higher than the first support lower position; a third support mounted on the frame at a position higher than the second support low position and having an opening wider than the width of the second support; a fourth actuator operatively connected to the third support for moving the third support between a first position beneath the first support and a second position; a sensor for determining the number of discrete objects in a stack, the sensor being operatively coupled to the to the third actuator; and a controller for controlling the first, second, third and fourth actuators. A method of using the system is also disclosed.

31 Claims, 10 Drawing Sheets

U.S. PATENT DOCUMENTS

| | | | |
|---|---|---|---|
| 3,662,901 A | | 5/1972 | Brintley, Sr. |
| 3,772,972 A | * | 11/1973 | Dutro et al. ............. 414/788.9 |
| 3,866,741 A | | 2/1975 | Carbon et al. |
| 3,998,339 A | | 12/1976 | Booth |
| 4,137,604 A | | 2/1979 | Sandberg et al. |
| 4,162,733 A | | 7/1979 | Wiseman |
| 4,236,855 A | | 12/1980 | Wagner et al. |
| 4,372,201 A | * | 2/1983 | Dudziak et al. ................ 100/7 |
| 4,541,763 A | * | 9/1985 | Chandhoke et al. ........ 414/790 |
| 4,558,779 A | | 12/1985 | Schmitt et al. |
| 4,676,708 A | | 6/1987 | Mojden |
| 4,768,642 A | | 9/1988 | Hunter |
| 4,807,741 A | | 2/1989 | Simelunas et al. |
| 4,921,398 A | | 5/1990 | Fluck |
| 4,955,794 A | * | 9/1990 | Fluck ..................... 414/790.4 |
| 5,069,019 A | | 12/1991 | Lodewegen |
| 5,127,209 A | | 7/1992 | Hunter |
| 5,141,219 A | | 8/1992 | Watts et al. |
| 5,215,428 A | * | 6/1993 | Masini .................... 414/789.5 |
| 5,346,206 A | * | 9/1994 | Steinhart .................... 271/305 |
| 5,354,170 A | | 10/1994 | Schweingruber |
| 5,431,530 A | * | 7/1995 | Kobayashi et al. ...... 414/794.4 |
| 5,460,479 A | * | 10/1995 | Neumann et al. ........ 414/789.5 |
| 5,480,278 A | | 1/1996 | Morgan |
| 5,669,754 A | | 9/1997 | Croteau |
| 5,720,593 A | * | 2/1998 | Pleake ..................... 414/789.9 |
| 5,788,459 A | * | 8/1998 | Neumann et al. ........ 414/789.9 |
| 5,820,335 A | | 10/1998 | Croteau |
| 5,865,106 A | | 2/1999 | van der Ent |
| 5,882,175 A | * | 3/1999 | Villacieros Fernandez .. 414/790 |
| 5,894,711 A | | 4/1999 | Davidson |
| 6,019,213 A | | 2/2000 | Schubert |
| 6,052,969 A | | 4/2000 | Hart et al. |
| 6,053,695 A | * | 4/2000 | Longoria et al. ......... 414/790.8 |
| 6,099,452 A | * | 8/2000 | Hoza et al. ................. 493/416 |
| 6,205,748 B1 | | 3/2001 | Daniele |
| 6,322,316 B1 | | 11/2001 | Hart et al. |
| 6,585,477 B1 | * | 7/2003 | Lawrence ................ 414/793.1 |

* cited by examiner

METHOD AND APPARATUS FOR STACKING DISCRETE PLANAR OBJECTS

CROSS-REFERENCE TO RELATED APPLICATIONS AND CLAIM TO PRIORITY

The present application claims the benefit of U.S. provisional patent application Ser. No. 60/290,342, filed May 14, 2001, the disclosure of which is incorporated by reference.

FIELD OF THE INVENTION

The present invention is directed to a method and apparatus for forming one or more rows of discrete, planar objects, into one or more stacks, and more specifically, toward a method and apparatus for continuously forming at least one moving stream of disk-like objects, such as frozen hamburger patties, into one or more stacks and moving the finished stacks to a station for further processing.

BACKGROUND OF THE INVENTION

Frozen hamburgers, chicken patties, sausage patties, and other disk-like food products typically are prepared by a manufacturer on one piece of equipment and then fed into a freezer. After leaving the freezer, they are screened by a metal detector, which causes contaminated patties to be ejected, and then conveyed to a stacker. Because the stacks formed by some stackers can vary in height, and because the number of stacks formed simultaneously by a stacker may be greater than the number of stacks that will fit in a case, the finished stacks are often manually removed from the stacker and loaded into cases. This manual loading step is labor-intensive, and, due to the presence of a human element, highly variable.

One known prior art patty stacking machine is disclosed in U.S. Pat. No. 6,052,969, assigned to the assignee of the present application, which is hereby incorporated by reference. That machine includes a conveyor for moving patties in a first direction and dropping them into helical coil. The patties fall between the loops of the coil, and as the coil is rotated, new loops are presented for receiving additional patties. The rotation of the coil advances the patties into a holder, and when the holder is filled, a mechanical jaw grips the stack and moves it to a packing station from which it is loaded into a packing machine. This machine serves its intended purpose adequately, but suffers from various problems such as being bulky. In addition, if patties are not accurately aligned with loops of the coil, they may hit the coil instead of falling between the loops which leads to stacks of varying heights and to product waste.

To maximize efficiency, it is preferable to have the entire process of stacking and packing patties automated, and to do so in a manner that allows for continuous production and that minimizes the likelihood of product jams. Furthermore, it is desirable that a patty stacking machine can easily be retrofitted to the end of a patty processing production line and that the machine be sufficiently compact so as not to interfere with other existing parts of the processing machinery.

SUMMARY OF THE INVENTION

These and other problems are addressed by the present invention which comprises a method and apparatus for receiving a plurality of disk-like objects, such as frozen hamburger patties, forming them into stacks, and transferring the stacks to a holding station from which they are packed into cartons. While the application is particularly well suited for use with frozen hamburger and related food patties, it may easily be adapted to process other food and non-food objects. Furthermore, nearly any symmetrical object can be processed according to the invention, and even non-symmetrical planar objects may be processed if they are properly oriented. Thus, while the invention will generally be described in the context of frozen, disk-like food patties, its application is in no manner limited to use with this type of product.

In a preferred embodiment, the invention comprises a continuous conveyor belt that is either part of a patty processing line or that is adjacent to a conveyor leading from a patty processing system and that receives patties therefrom. The subject invention can be used to stack a single row of patties, but for reasons of speed and efficiency, patties are usually arranged on a conveyor in multiple rows, frequently four, five or six rows. Therefore, the preferred embodiment of the invention is designed to process multiple rows by simultaneously forming multiple stacks and then transferring those stacks to a holding location, while another portion of the stacker continues to receive patties from the conveyor. In this manner, the stacker can process patties continuously, and there is no need to stop the conveyor to allow the stacks to be transferred from the stacker to the holding location.

The conveyor has an end edge over which the patties of each row fall onto a first holder, sometimes referred to as an upper support or shelf. The upper support preferably comprises a plurality of pairs of parallel pins that extend from a support toward the end edge of the conveyor so that individual patties in a given row drop one at a time off the end of the conveyor onto a pair of pins. Hereafter, the processing of a single stack of patties will sometimes be discussed, it being understood that other stacks are being formed substantially simultaneously on adjacent pairs of pins. The upper support is lowered as each new patty falls onto it in order to keep the top of the stack on the shelf about the same distance beneath the end edge of the conveyor. The height of the top of the stack varies somewhat during processing, but it preferably is maintained within a fairly narrow range to ensure that the patties drop consistently and form stacks. In the preferred embodiment, a counter adjacent the conveyor is used to count patties in a row just before they fall onto the upper support, and a cam is used to lower the shelf at a known rate.

A second holder comprising a plurality of fingers is positioned beneath the upper support, with each finger aligned with the opening between a pair of upper support pins. As the upper support drops, the pins eventually pass to each side of one of the fingers, and as the upper support drops further, the bottom of the stack contacts a finger on the second holder and is supported thereby. When the stack is completely supported by the fingers, the upper support pivots away from the stream of falling patties and returns to its starting position while the second holder continues to drop, keeping the top of the stack at a generally constant height. A transfer device is mounted beneath the second support, which device includes a plurality of openings aligned with each of the fingers on the second support. When a stack contains the correct number of patties, or is otherwise determined to be complete, the second holder drops so that the fingers pass through the openings in the transfer device, leaving the stacks supported by the transfer device. Preferably, as soon as the second shelf begins to drop, the end of the conveyor is moved to lengthen the conveyor and create a gap in the flow of patties; this delays the release of the next group of patties and allows the upper shelf to move into position to catch additional patties. The upper support thus supports a next group of falling patties, while the following processing steps are carried out on the first stack.

Once the stacks are supported on the transfer device and the fingers of the second support are located beneath the transfer device, the transfer device secures the stacks and moves sideways to transfer the stacks to a holder. As the transfer device is moving the stacks to the holder, the second support is free to return to its starting position beneath the upper support. Once the transfer of patties is complete, the transfer mechanism returns to its starting location beneath the second support, and the process is repeated.

It is therefore a principal object of the present invention to provide a stacking machine for forming a plurality of objects into one or more stacks.

It is another object of the invention to provide a method of forming a plurality of objects into one or more stacks of a fixed size in a continuous manner.

It is a further object of the present invention to provide a stacking machine having a transfer mechanism for transferring a first set of finished stacks to a holding area while a second set of stacks is being formed.

It is yet another object of the present invention to provide a stacking machine having first and second supports for supporting one or more stacks of planar objects.

It is yet a further object of the present invention to provide a stacking machine that is compact and easily retrofittable to existing equipment.

It is still another object of the present invention to provide a stacking machine for forming one or more stacks of planar disk-like objects that is reliable and not subject to jamming.

In furtherance of these objects, a method of forming a stream of discrete objects into a stack is disclosed that includes the steps of providing a frame having a top, a bottom and sides and providing a plurality of discrete objects each having a width. A first support is provided on the frame that has an opening smaller than the width of said objects, which support is movable vertically between upper and lower positions and movable horizontally between engaged and disengaged positions. The first support is held in said upper and engaged positions while said discrete objects are dropped onto said first support to form a stack having a top and a bottom. The first support is moved toward the lower position to maintain the top of said stack at a first level relative to said frame. A second support is provided beneath said first support which second support has a width less than the opening in said first support, and the second support is movable between a high position above said lower position and a low position. The first support is lowered toward the second support until said second support passes through said opening in said first support and contacts the bottom of said stack. Then the first support is moved to said disengaged position. The second support is lowered to maintain the top of said stack at said first level. A third support is provided that has an opening and is translatable between a first position beneath said second support and a second position. A sensor senses for the occurrence of a stack finished condition, and when that condition is detected, the second support is lowered until it passes thought the opening in said third support and said third support contacts the stack bottom.

Another aspect of the invention comprises a system for forming a plurality of discrete objects into a stack that includes a frame having a top, a bottom and sides and a conveyor associated with the frame that has an end edge for dispensing discrete objects. A first support is mounted on the frame near the end edge for receiving objects from the end edge and has an opening with a width smaller than the width of the objects. A first actuator is operably connected to the first support for moving the first support between first and second positions relative to the end edge and a second actuator is operably connected to the first support for moving the first support between upper and lower positions relative to the frame. A second support is mounted on the frame beneath the first support and has a width less than the width of the opening in the first support. A third actuator is operatively connected to the second support for moving the second support between high and low positions where the second support high position is higher than the first support lower position. A third support is mounted on the frame at a position higher than the second support low position, and the third support has an opening wider than the width of the second support. A fourth actuator is operatively connected to the third support for moving the third support between a first position beneath the first support and a second position, and a sensor is provided for determining the number of discrete objects in a stack, where the sensor is operatively coupled to the to the third actuator. A controller controls the first, second, third and fourth actuators.

Another aspect of the invention comprises a method of forming a stream of discrete disk-like objects into a stack that involves providing a frame having a top, a bottom and sides supporting a conveyor having an end edge. A plurality of discrete disk-like objects, each having a diameter, are placed on the conveyor. A first support is provided on the frame adjacent the end edge, which first support includes first and second spaced apart pins separated by a distance less than the diameter of the objects. The first support is movable vertically between upper and lower positions and pivotable between engaged and disengaged positions. The first support is held in the upper position and in the engaged position and the conveyor is operated to cause the objects to fall over the end edge of the conveyor and onto the first support to form a stack having a top and a bottom. A counter is incremented each time one of the disk-like objects passes a given location on the conveyor, and the first support is toward the lower position each time the counter is incremented. A second support is mounted beneath the first support that has a width less than the distance between the pins, the second support being movable between a high position above the lower position and a low position. The first support is lowered over the second support until the second support passes between the pins and contacts the bottom of the stack, then the first support is pivoted the disengaged position. The second support is lowered each time the counter is incremented when the stack is in contact with the second support. A third support is provided that has an opening wider than the second support and that is translatable between a first position beneath the second support and a second position. When the counter reaches a predetermined count, the second support is lowered until it passes through the opening in the third support and the third support contacts the stack bottom. The first support is moved to the upper position and the engaged position after the top of the stack drops beneath the lower position, and the third support is moved to the second position and releases the stack into a stack holder after the third support contacts the stack bottom. Next, the second support is moved to the high position after the third support moves from the third support first position, and the third support is then returned to the third support first position after the stack has been released into the stack holder.

An additional aspect of the invention is a method of forming a plurality of rows of discrete objects into a plurality of stacks that involves providing a frame having a top, a bottom and sides and a plurality of discrete objects, each having a width, arranged in rows. A first support is provided on the frame that has a plurality of spaced apart openings smaller than the width of the objects, the first support being movable vertically between upper and lower positions and movable horizontally between engaged and disengaged positions where each of the plurality of openings is aligned with one of the plurality of rows. The first support is held in the upper and engaged positions and the discrete objects are dropped onto the first support over the plurality of openings to form a plurality of stacks each having a top and a bottom. Next, the first support is moved toward the lower position to maintain the tops of the stacks at a first level relative to the frame. A second support is provided beneath the first support comprising a plurality of fingers, each finger being aligned with and having a width less than the width of the openings in the first support. The second support is movable between a high position above the lower position and a low position. The first support is lowered over the second support until the plurality of fingers on the second support pass through the openings in the first support and contact the bottoms of the stacks. The first support is moved to the disengaged position and the second support is lowered to maintain the top of the stacks at the first level. A third support having a plurality of openings wider than and aligned with the plurality of fingers and translatable between a first position beneath the second support and a second position is provided. A sensor senses for the occurrence of a stack finished condition, and, when the condition is detected, the second support is lowered until the fingers pass thought the openings in the third support and the third support contacts the bottoms of the stacks. The stacks on the third support are covered and the third support is pivoted to invert the stacks on the third support while being translated toward a discharge location.

A further aspect of the invention comprises a system for forming a plurality of discrete objects arranged in rows into a plurality of stacks that includes a frame having a top and a bottom and a first side having an inner wall and a second side having an inner wall facing the first side inner wall. The first side inner wall and the second side inner wall each include a guide track. A first cam is mounted on the frame as is a drive for rotating the first cam and the second cam. A conveyor is associated with the frame and has an end edge for dispensing rows of discrete objects. A first support is mounted on the frame near the end edge, for receiving objects from the end edge, and has a plurality of rods spaced by a distance less than the width of the objects. A guide wheel is received in each of the guides on the frame first wall and the frame second wall, and a cam follower movable into engagement with the first cam is attached to the first support. A first actuator is operably connected to the first support for moving the first support between first and second positions relative to the end edge. A second actuator is operably connected to the first support for moving the first support between upper and lower positions. A second support is mounted on the frame beneath the first support and comprises a plurality of fingers each having a width less than the distance between the first support rods. A third actuator is operatively connected to the second support for moving the second support between high and low positions, the second support high position being higher than the first support lower position. A third support is mounted on the frame at a position higher than the second support low position and comprises a frame portion and a tray portion, the tray portion including a bottom wall having a plurality of openings wider than the width of the fingers. A fourth actuator is operatively connected to the third support for moving the third support between a first position beneath the second support and a second position, and a sensor is provided for counting the number of objects passing a point on the conveyor, the sensor being operatively connected to the drive for rotating the first cam and the second cam. A controller is also provided for controlling the first, second, third and fourth actuators and the drive.

Another aspect of the invention comprises a system for forming a plurality of discrete objects into a stack comprising a frame having a top, a bottom and sides, a conveyor associated with the frame and having an end edge for dispensing discrete objects, and a receiver mounted on the frame near the end edge for receiving objects from the end edge, the receiver having a first object-engaging portion adjacent the end edge and a second object-engaging portion located beneath the conveyor.

A further object of the invention comprises a stacker for forming a plurality of objects into stacks comprising a frame and a first support mounted on the frame having an opening with a width smaller than the width of the objects and being shiftable between an upper position and a lower position relative to the frame. A second support is also mounted on the frame beneath the first support and is aligned with the opening in the first support. The second support has a width less than the width of the opening in the first support and is shiftable between a first position above the first support lower position and a second position so that shifting the first support from the upper position to the lower position while the second support is in the first position causes the second support to pass through the opening.

An additional aspect of the invention comprises a transfer mechanism for receiving a stack of objects from a stacker and moving the stack to a location away from the stacker that includes a support having an opening wider than a stack-supporting element of the stacker, a wall normal to the support for engaging the side of the stack and a cover shiftable between a first position adjacent the top of the stack and a second position. The transfer mechanism also includes an actuating mechanism for moving the cover to the first position and the support toward the location while inverting the support to bring the stack bottom into a position above the stack top.

An additional aspect of the invention comprises a system for forming a plurality of discrete objects into a stack comprising a frame having a top, a bottom and sides and a conveyor associated with the frame, which conveyor has a generally horizontal surface movable in a first direction for moving a plurality of objects in the first direction toward and over an end edge. A movable receiver is mounted on the frame near the end edge for receiving objects from the end edge and is angled with respect to the surface, so that objects supported on the movable receiver move in a direction opposite to the first direction.

BRIEF DESCRIPTION OF THE DRAWINGS

These and other objects will be better understood after a reading and understanding of the following detailed description of a preferred embodiment of the invention together with the following drawings of which.

DETAILED DESCRIPTION OF THE INVENTION

Figure 1:
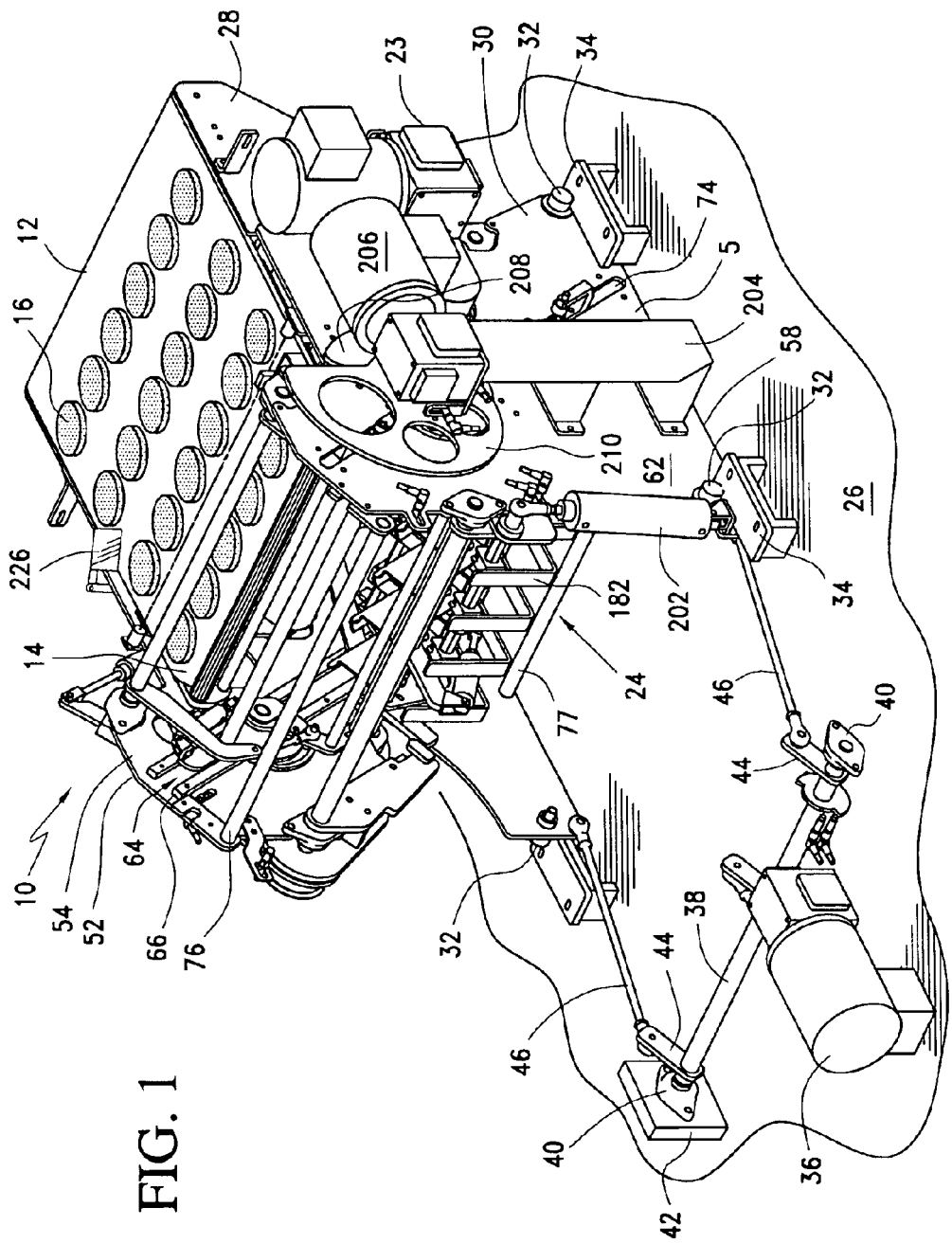
FIG. 1 is a perspective view of a stacking device according to the present invention which device includes a conveyor, an upper support, a lower support and a transfer device.
Figure 3:
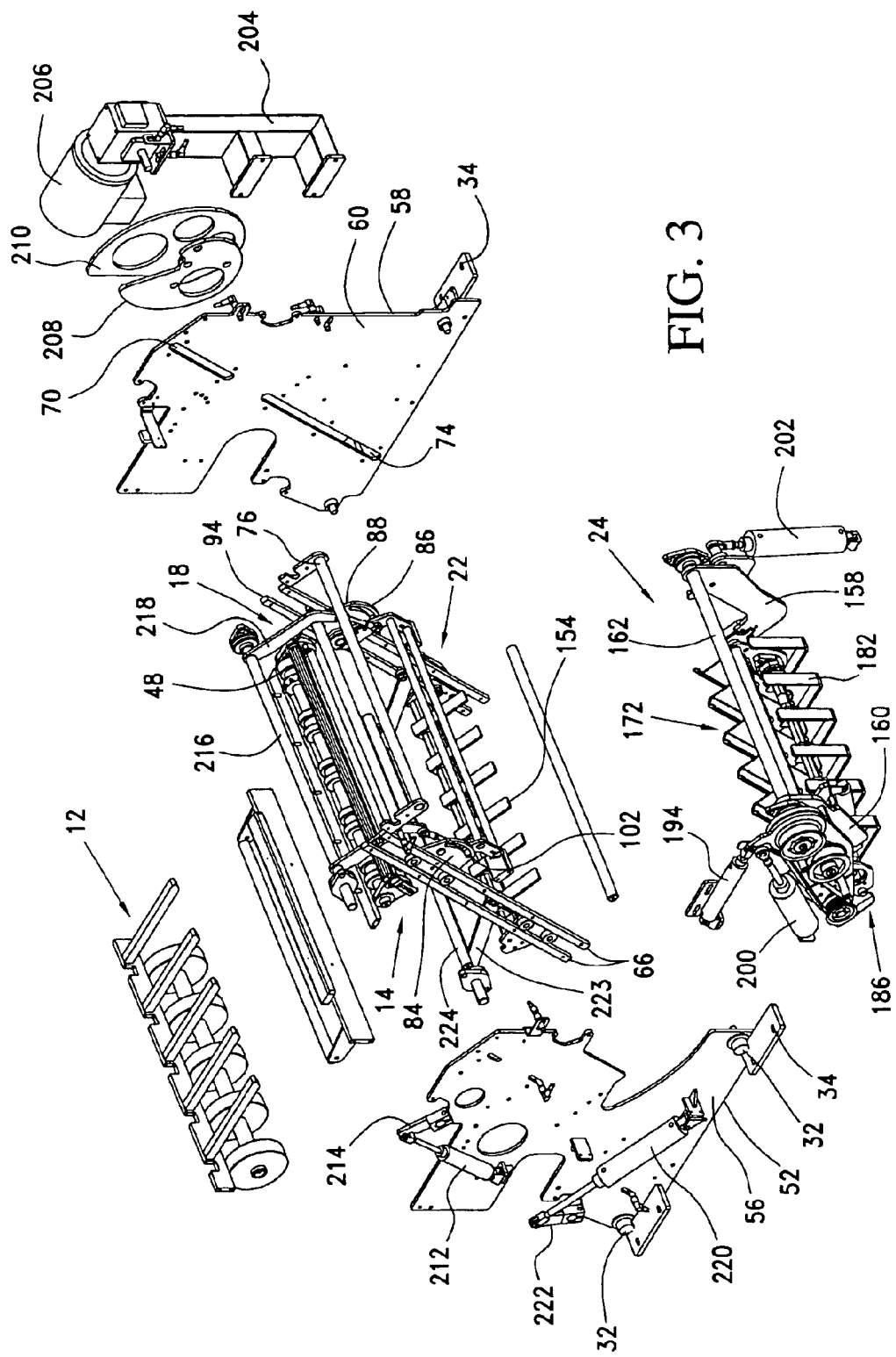
FIG. 3 is an assembly drawing of the stacking device of FIG. 1.
Figure 4:
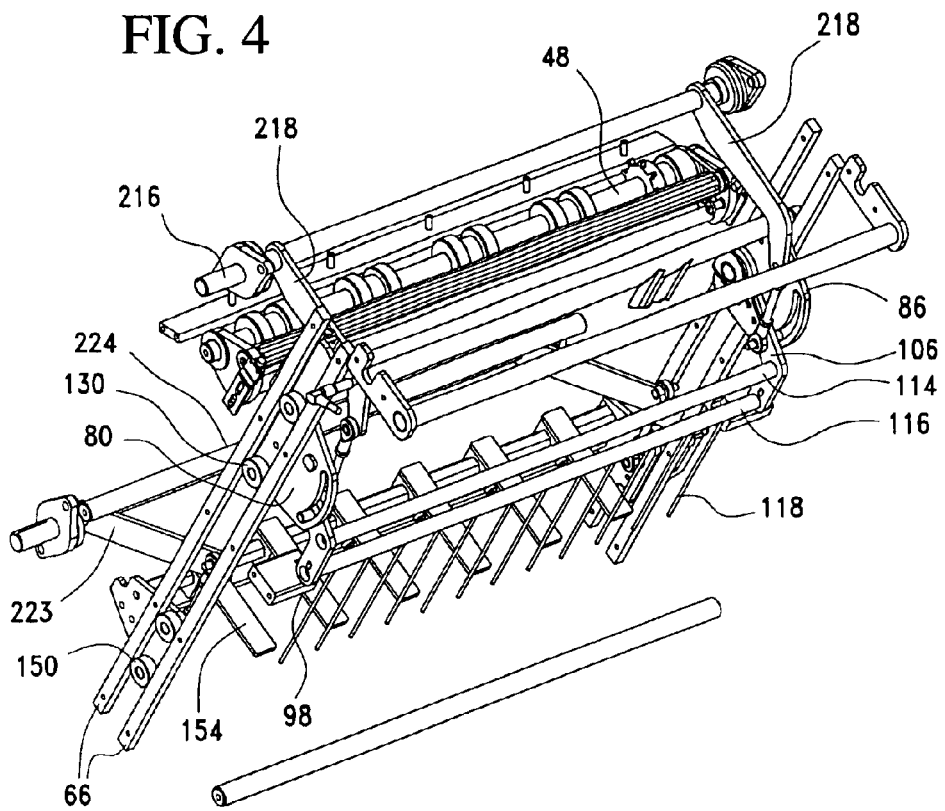
FIG. 4 is a perspective view of the upper support and lower support of FIG. 1.
Figure 5:
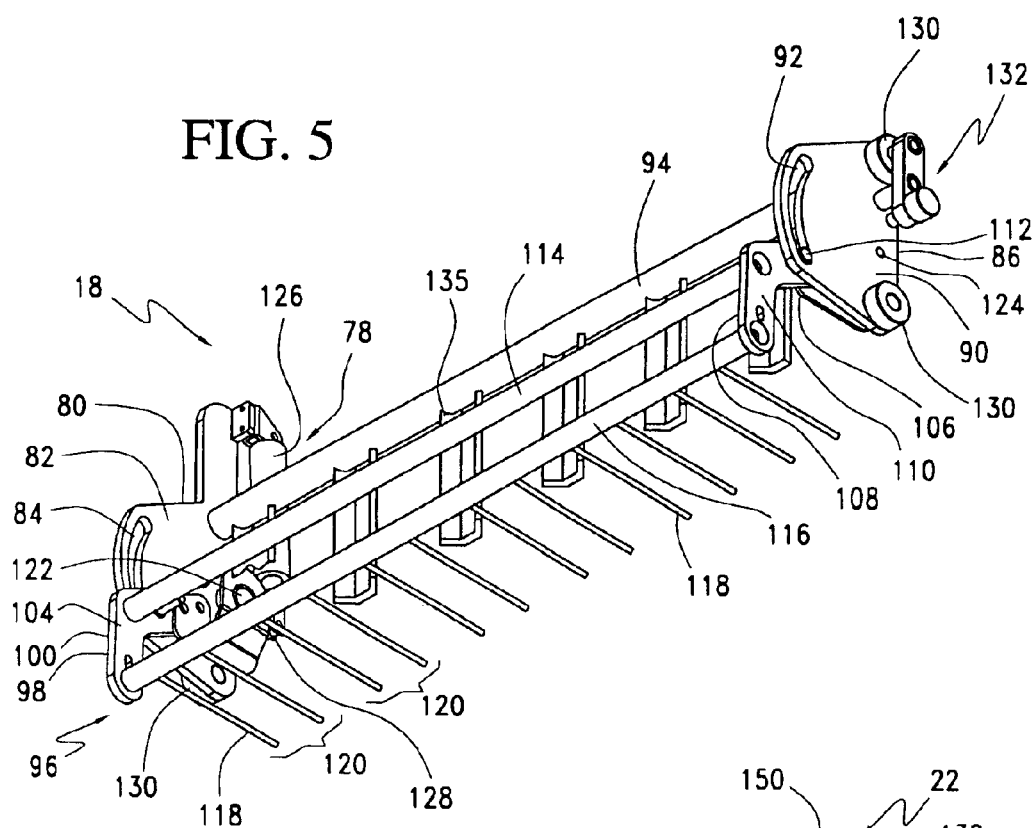
FIG. 5 is a perspective view of the upper support of FIG. 1.
Figure 11:
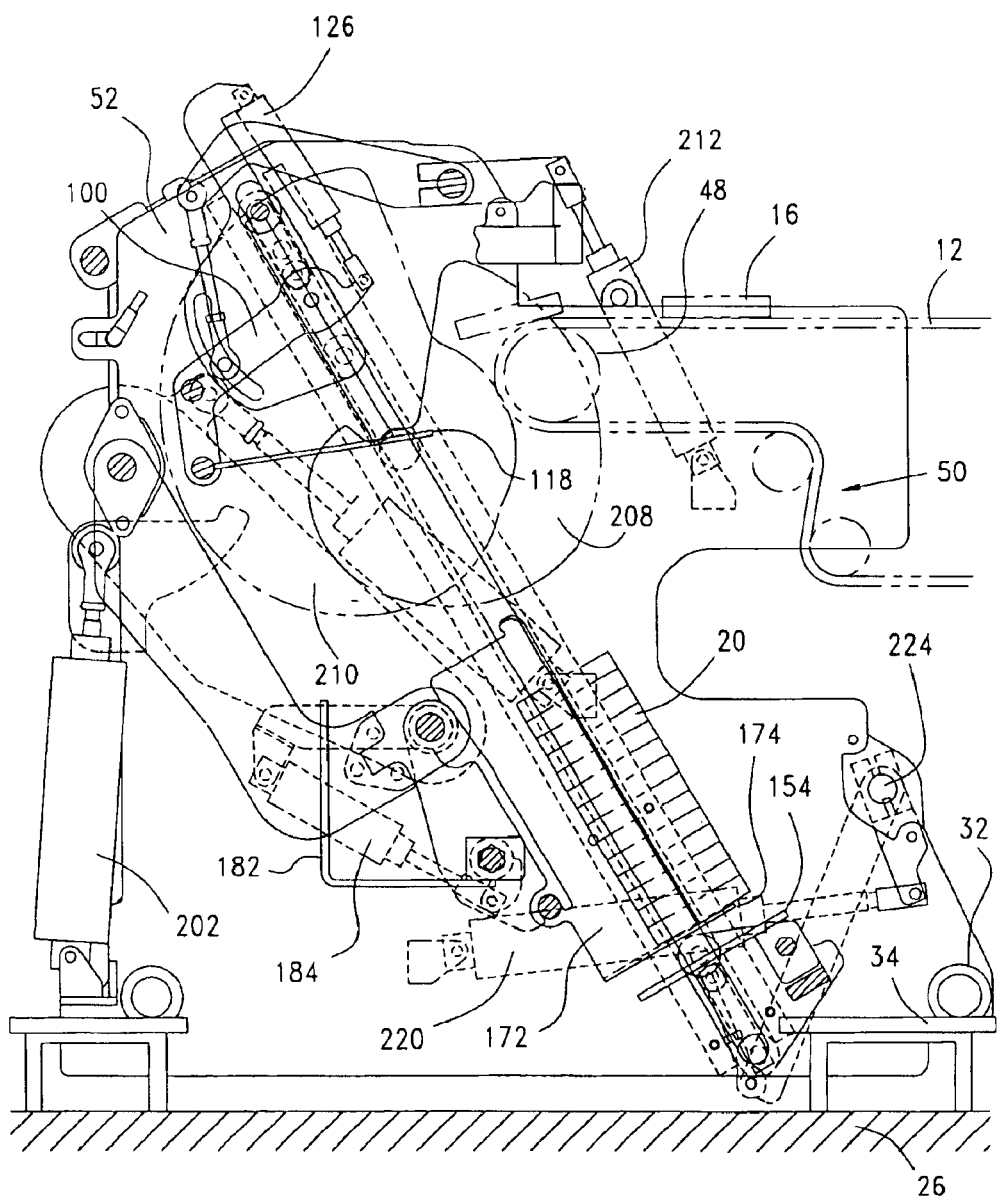
FIG. 11 is a side elevational view of the stacking device of FIG. 1 showing a stack of objects supported on the lower support moving toward the transfer device which has returned to its starting location beneath the second support.

Referring now to the drawings, wherein the showings are for purposes of illustrating a preferred embodiment of the invention only, and not for the purpose of limiting same, a general overview of the present device can be gained from viewing FIGS. 1 and 3 which show a stacking device designated generally by the numeral 10, with an adjacent conveyor 12 having an end edge 14. A plurality of disk-shaped objects 16, in this case, frozen hamburger patties, are arranged in rows on the conveyor 12 extending in the direction of movement of the conveyor. As conveyor 12 moves, it causes patties 16 to be advanced so as eventually to drop off end edge 14 onto an upper support 18, as best shown in FIG. 5, to form stacks 20 of patties thereon as best shown in FIG. 11. Upper support 18 is downwardly movable in order to keep the top of stacks 20 at a generally constant level with respect to end edge 14 of the conveyor 12. As upper support 18 descends, it transfers the stacks 16 to a lower support 22, as best shown in FIG. 3, and moves laterally out of the falling streams of patties so that further patties 16 from the conveyor 12 fall directly onto the stacks 20 supported by lower support 22. The lower support 22 is downwardly movable and continues to drop until a sensor 226 detects that the stacks 20 have reached their final size. At this point, lower support 22 transfers the stacks 20 to a stack transfer mechanism 24 that moves the stacks 20 laterally away from the conveyor 12 toward a discharge location. Additional falling patties 16 are caught by upper support 18 or lower support 22 as discussed above, and transfer device 24 returns to its starting position beneath the upper support 18 and the conveyor 12 before a subsequent set of stacks of patties 20 is complete. Controller 23, as best shown in FIG. 1, controls the operation of the actuators and drives described herein, and is preferably a computer or PLC that controls the speed of the various drives and the operation of the actuators to carry out the steps of the process described herein. This arrangement allows for a continuous processing of patties 16 arriving at the end edge 14 of a conveyor 12 without the need to stop the conveyor each time a stack is completed.

Stacker 10 is installed on a fixed support 26, such as a factory floor, and includes a fixed frame portion 28 fixed with respect to support 26 and a movable frame portion 30 that moves with respect to the fixed frame portion 28, which fixed frame portion 28 and movable frame portion 30 for a frame for the stacker. Movable frame portion 30 includes four support wheels 32 resting on four platforms 34, which in turn rest on the fixed support 26. A motor 36 is operable connected to a shaft 38 which is rotatably supported by two bearings 40 that are supported by bearing supports 42, one of which is shown in FIG. 1, mounted on floor 26. Two arms 44 are fixed to shaft 38 and extend radially therefrom so that the ends of arms 44 describe an arc of a circle as the shaft 38 rotates. Tie rods 46 connect arms 44 to movable frame 30 so that, as motor 36 turns shaft 42 in a first direction, the movable frame portion 30 is pulled along platforms 34 toward motor 36, and as motor 36 turns in a second direction, the movable frame portion 30 is pushed along platforms 34 away from motor 36. The roller 48 supporting the end edge 14 of the conveyor 12 (FIG. 3) is supported on the movable frame portion 30 while other portions of conveyor 12 are supported by the fixed frame portion 28. Therefore, the conveyor 12 includes a slack take-up mechanism 50, shown in FIGS. 9–12, which allows the effective length of the conveyor 12 to increase and decrease as the movable frame portion 30 moves away from and back towards the fixed frame portion 28. When the effective length of the conveyor 12 is increased in this manner, the spacing is increased between rows of patties 16 arriving at end edge 14, and this extra spacing or gap allows the upper support 18 to pivot back into the flow of falling patties to start a new stack.

Movable frame portion 30 comprises a first vertical plate member 52 having an inner wall 54 and an outer wall 56, and a second vertical plate member 58 having an inner wall 60 and an outer wall 62. A guide 64 is formed on inner wall 54 of the first vertical plate member 52 by a pair of spaced rails 66, while an upper guide is formed in the second vertical plate 58 by an upper slot 70, and a lower guide is formed in second vertical plate 58 by a lower slot 74. Rods 76 and 77 extend between the inner walls of the first and second vertical plates to maintain their spacing.

With reference to FIGS. 3 and 5, upper support 18 comprises a carrier 78 including a first side plate 80 having an inner side 82 and an arcuate slot 84, and a second side plate 86 having an inner side 88, an outer side 90 and an arcuate slot 92 aligned with arcuate slot 84 in the first side plate 80. The second side plate 86 is parallel to the first side plate 80 and spaced therefrom by connecting rod 94. Carrier 78 supports a pivoting member 96 comprising a first L-shaped member 98 having an outer wall 100 with a pin 102 (seen in FIG. 3) projecting therefrom and an inner wall 104, and a second L-shaped member 106 having an inner wall 108 facing inner wall 104 of the first L-shaped member 98 and an outer wall 110 from which a pin 112 projects. The outer wall 100 of first L-shaped member 98 overlies the inner side 82 of first side plate 80, with pin 102 received in arcuate slot 84, and extends beyond the first side plate 80. The outer wall 110 of the second L-shaped member 106 overlies the inner side 88 of second side plate 86 with pin 112 received in arcuate slot 92 of the second side plate 16. A first rod 114 extends between the middle portions of the inner walls 104, 108 of the first and second L-shaped members 98 and 106, respectively, and a second rod 116 extends between the portions of the first and second L-shaped members 98 and 106, respectively, that project beyond the first side plate 80 and second side plate 86. A plurality of pins 118 arranged in pairs 120 spaced apart by a given distance extend radially from second rod 116 as best shown in FIG. 5. First L-shaped member 98 is pivotally connected to the inner wall 82 of first side plate 80 at a pivot point 122, while second L-shaped member 106 is pivotally connected to the inner wall 108 of the second side plate 86 at a pivot point 124. An actuator 126, preferably a pneumatically actuated cylinder, is connected between first side plate 80 and an end 128 of first L-shaped member 98 on the opposite side of pivot point 122 from rod 114, which actuator 126 causes first L-shaped member 98, and hence carrier 78, to pivot about pivot points 122 and 124, while pins 102 and 112 in arcuate slots 84, 92 guide the movement of the pivoting member 96 with respect to the carrier 78. Guide wheels 130 are mounted on the outer walls of the first side plate 80 and second side plate 86 which wheels are received in the guides 64, 70 of the vertical plates 52 and 58 of the movable frame portion 30. A cam follower 132 also extends from the outer side 90 of the second side plate 86. Plates 133 attached to rod 94 form a backstop against which patties impact as they form stacks on the pairs 120 of pins 118.

Figure 6:
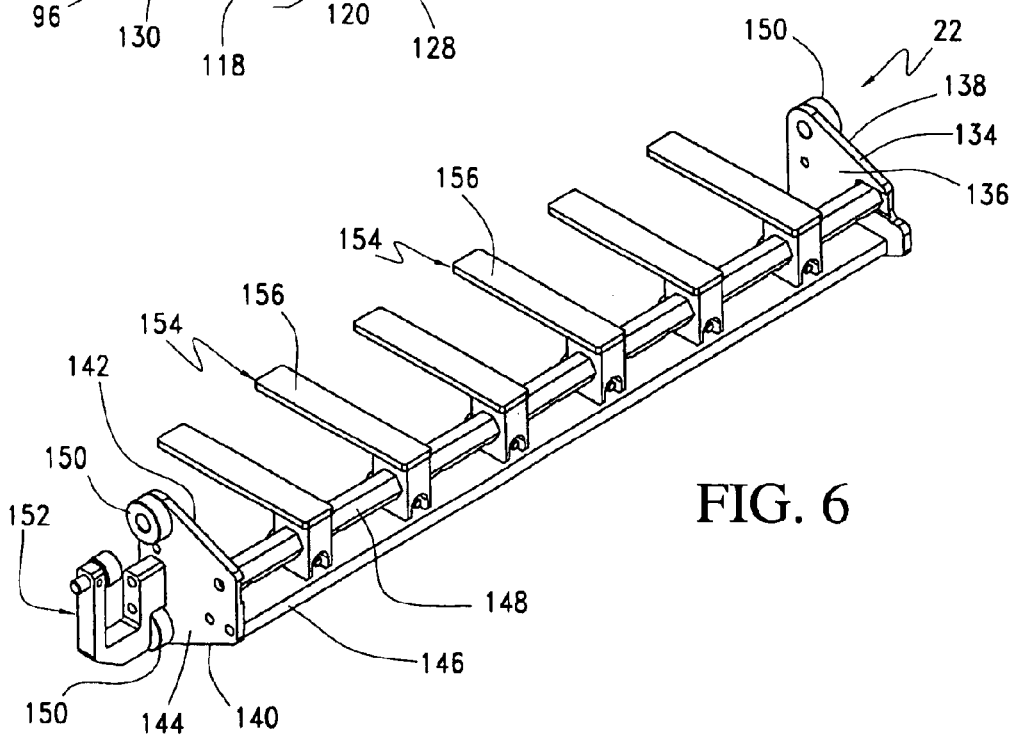
FIG. 6 is a perspective view of the lower support of FIG. 1.

FIG. 6 illustrates lower support 22, which includes a first side plate 134 having an inner side 136 and an outer side 138, and a second side plate 140 having an inner side 142 and an outer side 144. A strut 146 connects the inner sides of the first and second side plates 134 and 140, respectively, and a hexagonal rod 148 extends between the inner sides of the first and second plates parallel to strut 146. Guide wheels 150 are attached to outer sides 138 and 144 of first side plate 134 and second side plate 140, respectively, and the outer side 144 of second side plate 140 further includes a cam follower 152. A plurality of fingers 154 are attached to hexagonal rod 148, each of which includes at least one planar surface 156.

Figure 7:
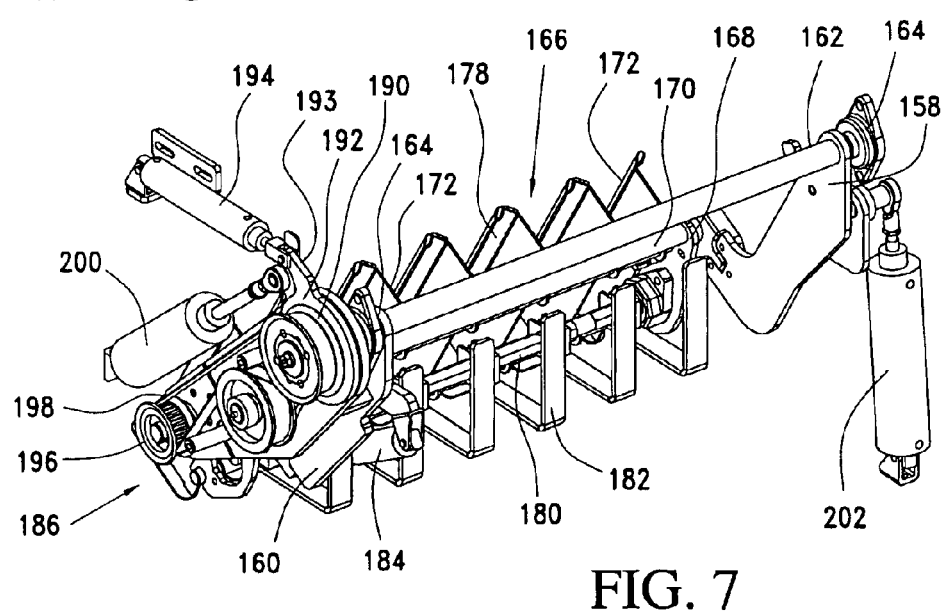
FIG. 7 is a perspective view of the transfer device of FIG. 1.
Figure 8:
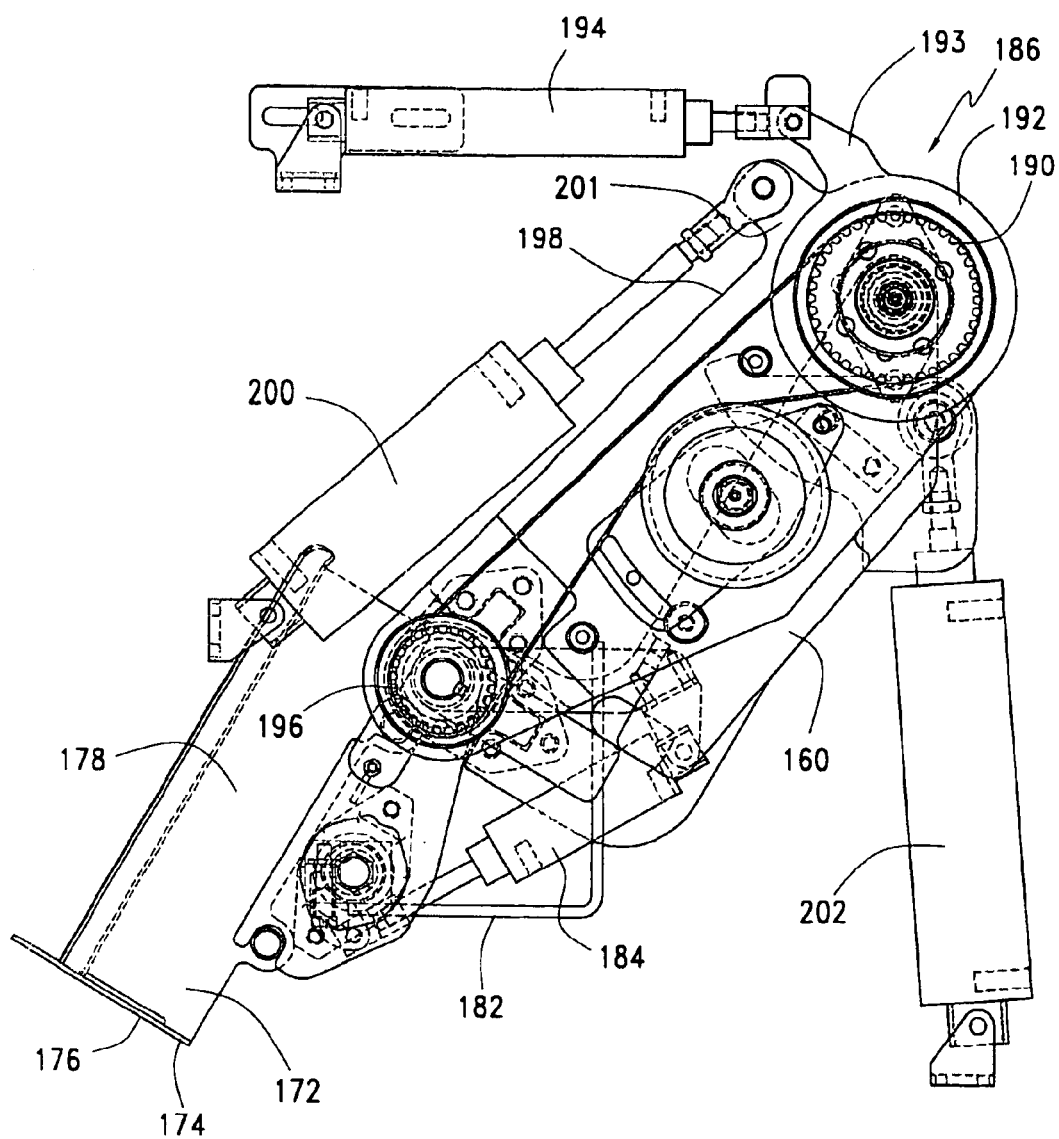
FIG. 8 is a side elevational view of the transfer device of FIG. 1.

Transfer mechanism 24, best shown in FIGS. 7 and 8, comprises a first L-shaped plate member 158 and a second plate member 160 parallel to and spaced from first plate member 158 by a rod 162 extending between end portions of plate members 158 and 160 which rod 162 is supported at either end by bearings 164. A tray assembly 166 includes two side plates 168 connected by a connecting rod 170. A plurality of trays 172, each having a bottom wall 174 having a slot 176 and side walls 178, are pivotally attached to plate members 158, 160. A hexagonal rod 180 is rotatably attached between side plates 168, and a plurality of L-shaped covering fingers 182 are attached thereto. Actuator 184, connected between the plate member 158 and hexagonal rod 180, rotates the hexagonal rod 180 to move the L-shaped fingers 182 between a first position where a portion of the L-shaped fingers 182 overlies the trays 172 and a second position, as best shown in FIG. 7, where no portion of the L-shaped fingers 182 overlies the trays 172.

Figure 2:
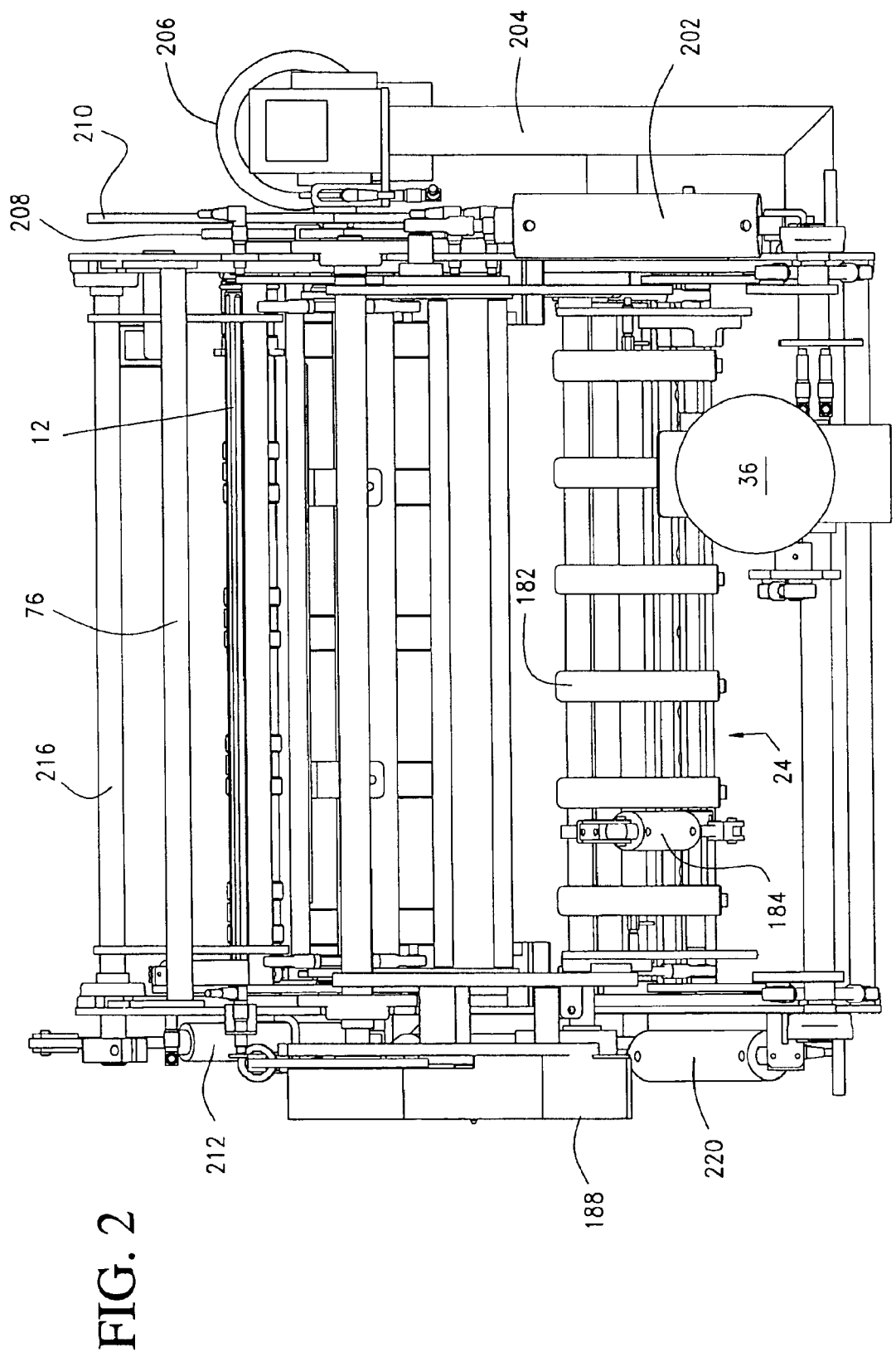
FIG. 2 is an end elevational view of the stacking device of FIG. 1.

As best shown in FIG. 7, a belt drive 186 is located in housing 188 (seen in FIG. 2) attached to plate member 160, and includes a first flanged wheel 190 mounted on the outer side of plate member 160, which flanged wheel is coupled to a member 192 having an extending lever arm 193 connected to an actuator 194. A second flanged wheel 196 is operably coupled to connecting rod 170 and rotationally coupled to first flanged wheel 190 by a belt 198. When actuator 194 presses against lever arm 164, it rotates the first flanged wheel 180 which rotation moves belt 198 and causes the second flanged wheel 196 and hence connecting rod 170 to rotate; this tilts tray assembly 166 with respect to plates 158, 160. Actuator 200 attached to second plate member 160 causes the entire tray assembly 166 to pivot about the axis of rod 162, while actuator 202 moves the tray assembly 166 away from the conveyor 12 toward a stack discharge location and return the tray assembly 166 to its starting position after the patties have been discharged.

Referring now to FIG. 1, a motor support 204 is mounted on the outer wall 62 of vertical support plate 58, and a motor 206 is mounted on the support. The motor 206 turns a shaft connected to vertical plate 58 and two cams—an inner cam 208 adjacent plate 58 and an outer cam 210 between the inner cam and the motor 206.

The mounting of upper support 18 between first vertical plate 52 and second vertical plate 58 is apparent in FIG. 3 which illustrates the guide wheels 130 of second L-shaped member 106 received between rails 66 of guide 64 and guide wheels 130 of first L-shaped member 98 extending toward upper slot 70 of second vertical plate member 58. Cam follower 132 rides along the outer surface of inner cam 208 and the downward movement of the upper support 18 is limited by the bottom end of slot 70. The mechanism for holding the upper support 18 against cam 208 is best seen in FIG. 3, and comprises an actuator 212 mounted on the outer wall 56 of first vertical plate 52 which moves a lever arm 214 attached to a rotatable shaft 216 mounted between first vertical plate 52, and second vertical plate 58 at an upper edge thereof. From shaft 216 extend first and second angled arms 218 which overlie connecting rod 94 of the upper support. By moving lever arm 214, actuator 212 raises and lowers angled arms 218 to press down upon the upper support or to move the arms 218 away from the upper support.

Lower support 22, as best seen in FIG. 3, is mounted between first vertical plate 52 and second vertical plate 58 with the guide wheels 150 of the outer sides 138 of first plate 134 received between rails 66 of guide 64 and the set of guide wheels 150 on the outer side 144 of second plate 140 extending through lower slot 74 of second vertical plate 58. Cam follower 152 is biased upwardly against outer cam 210 by a mechanism that includes an actuator 220 mounted on the outer wall of 56 of the first vertical plate 52 connected to a lever arm 222 which in turn is connected to a shaft 224 rotatably mounted between the first and second vertical plates 52, 58 on the edge of the plates beneath the conveyor 12. Two arms 223 connect shaft 224 to first side plate 134 and second side plate 140 of lower support 22 so that, when actuator 220 moves lever arm 222 and turns shaft 224 in a first direction, cam follower 152 of the lower support 22 is pressed upwardly against outer cam 210 and pulled away from outer cam 210 when shaft 224 is turned in the opposite direction.

Figure 9:
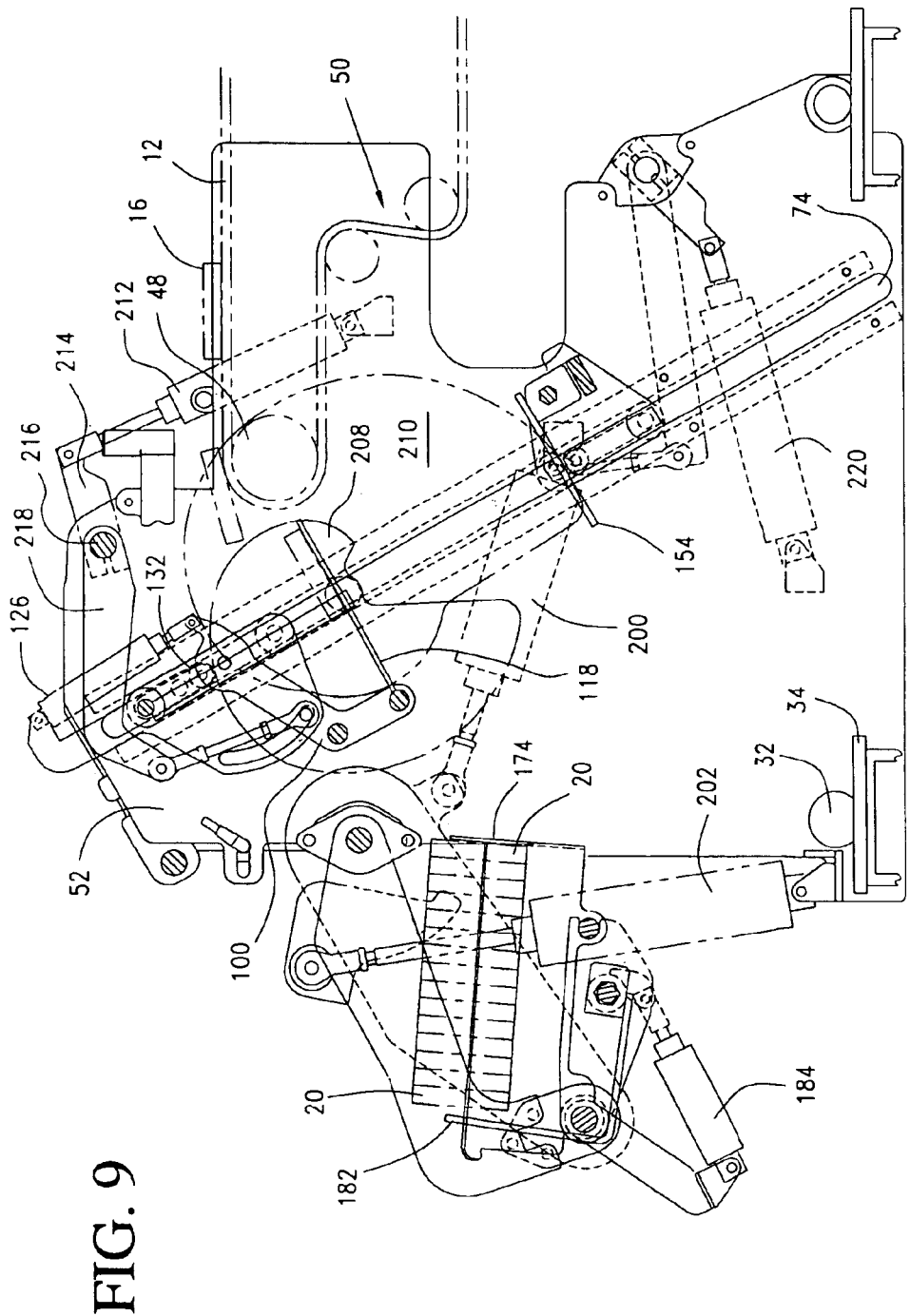
FIG. 9 is a side elevational view of the stacking device of FIG. 1 showing a stack of objects that has just been transferred from the second support to the transfer device.

The operation of the stacker will now be described with reference primarily to FIGS. 9 though 12 which show the stacker in various stages of forming a plurality of hamburger patties into stacks and transferring those stacks from a stacking location toward a discharge location. Beginning with FIG. 9, patties 16 move along conveyor 12 and fall over the end edge 14 of the conveyor onto fingers 118 of upper support 18. FIG. 9 shows one patty 16 already supported by the fingers 118 with another about to fall onto the first patty to begin to form a stack. Beneficially, the upper support 18 and the lower support 22 are located generally beneath the end edge 14 of the conveyor 12, and thus the stacks that form on the upper and lower supports are also formed generally beneath the conveyor 12. This formation of stacks beneath the end of the conveyor advantageously contributes to the compact size of this stacking device because the stacks are formed against the direction of movement of conveyor 12. Actuator 212 rotates lever arm 214 to turn shaft 216 to press arms 218 against the upper support to hold the upper support cam follower 132 against inner cam 208, and, as the radius of cam 132 decreases while it rotates counterclockwise as viewed in FIGS. 9–12, the upper support 18 moves downwardly toward the lower support 22. The rotation of the inner cam 208 is based on the rate that the stack is forming as detected by optical detector 226, best shown in FIG. 1, so that the top of stack 20 remains approximately the same distance below conveyor end edge 14 and ensures that each patty drops a similar distance in a similar manner to form consistent stacks.

Figure 10:
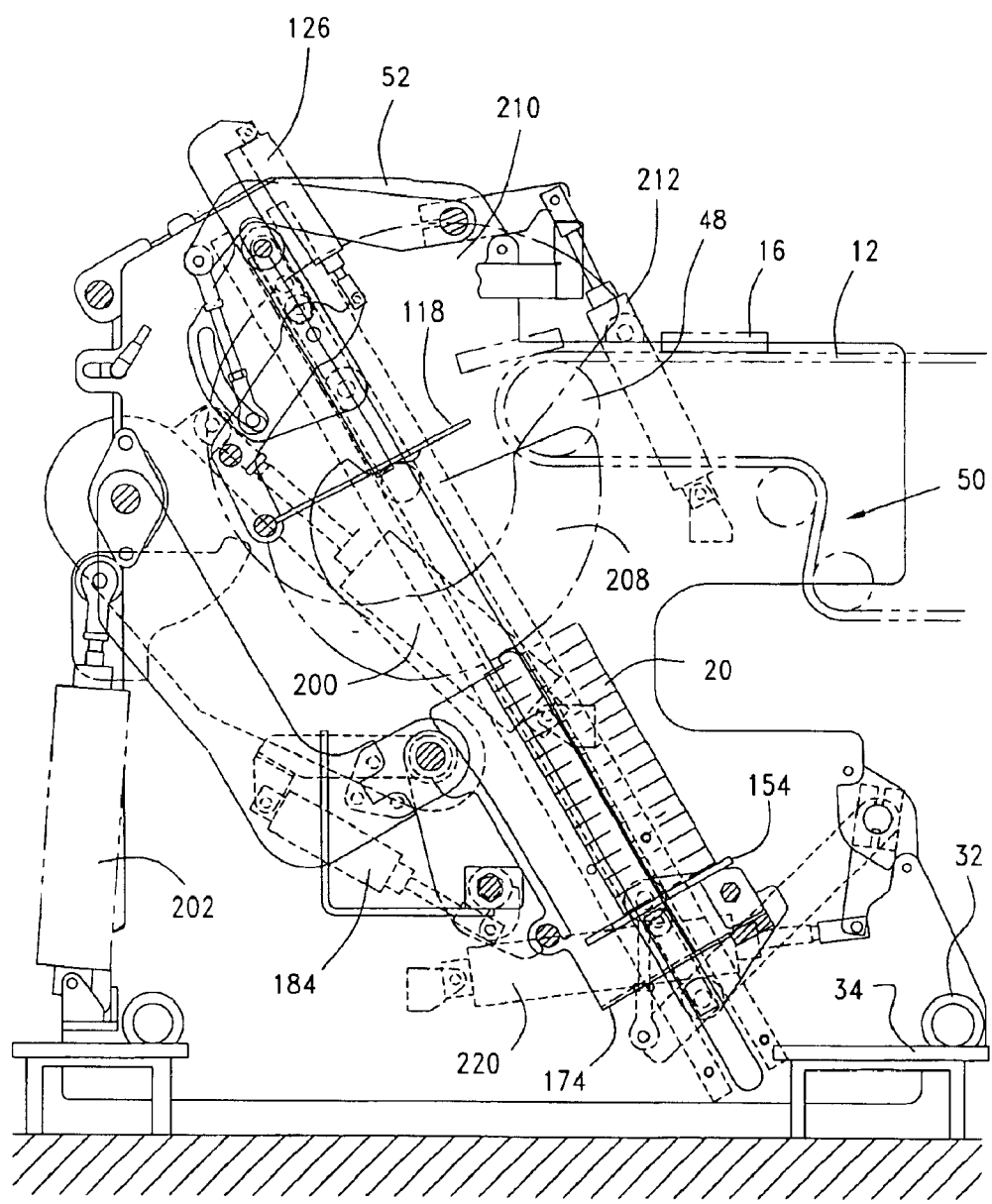
FIG. 10 is a side elevational view of the stacking device of FIG. 1 showing the transfer device in a position to release a stack at a discharge location while a second stack of objects on the upper support moves toward the lower support.

FIG. 10 shows stack 20 on fingers 118 has grown in size and moved closer to the finger elements 154 of lower support 22. As the upper support 18 continues its descent, the pair of fingers 118 of the upper support 18 supporting the stack will pass to either side of one of the fingers 154 of the lower support 22 so that, as the upper support 18 continues to drop past the lower support 22, the stack 16 will be deposited on the lower support 22, and actuator 126 will pivot the upper support 18 away from the conveyor 12 so that additional patties 16 will fall onto the stack on the lower support 22.

In FIG. 11, the stack has grown to its finished size, at which point actuator 220 pivots shaft 224 to drop the lower support 22 to cause lower support finger 154 to pass through the slot 176 in bottom wall 174 of one of the trays 172 of the transfer mechanism 24, to leave the stack supported on the transfer mechanism 24. In this figure too, the pins 118 of the upper support 18 can be seen moving back toward conveyor 12 to catch the next patty falling therefrom in order to start a second stack rather than allowing it to fall on to the completed stack on the transfer mechanism. At this point, motor 36 rotates shaft 38 to pull movable frame 30 away from fixed frame 28 to lengthen the conveyor (effectively moving end edge 14 away from the next row of patties) and delay the passage of additional patties over end edge. This second stack will be processed in the same manner as was the first stack.

Figure 12:
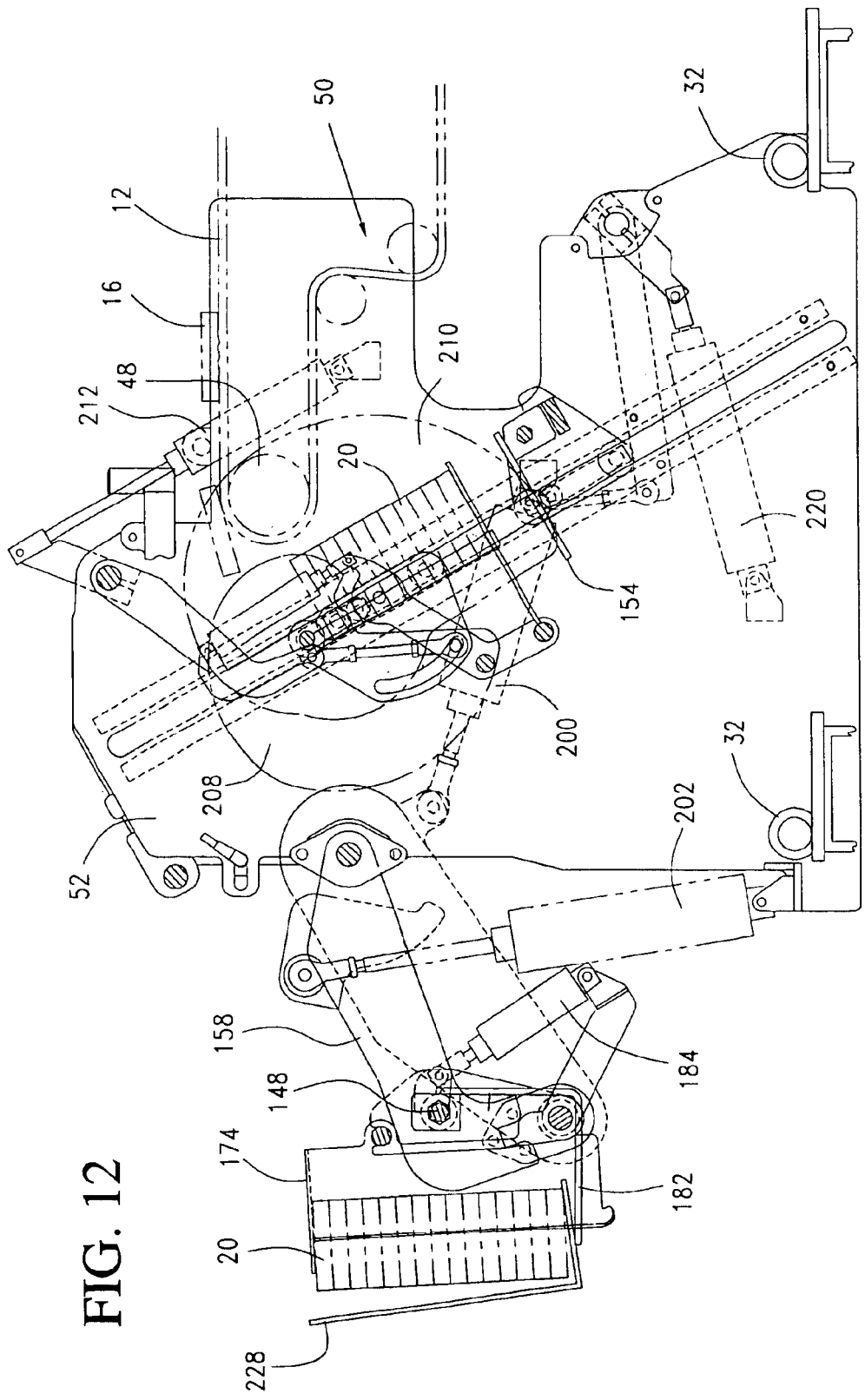
FIG. 12 is a side elevational view of the stacking device of FIG. 1 showing the transfer device rotating and translating a stack of objects toward a discharge location while the upper support catches objects dropping off the conveyor.

FIG. 12 shows the transfer mechanism 24 has rotated and translated away from the conveyor 12 toward a discharge location 228 on which the stacks will be deposited. To accomplish this movement, actuator 200 first pulls and then pushes against lever arm 201 to rotate lever arm 201 in a counterclockwise direction as seen in FIG. 8 which, through a gearing mechanism, rotates tray assembly 166 to the inverted orientation seen in FIG. 12. Actuator 194 presses against lever arm 193 to pivot the tray assembly 166 relative to the transfer mechanism wall 158 to fully invert the stack 20 of patties and deposit them onto holder 228, which holder has a slot in a bottom support wall to allow covering fingers 182 to pass therethrough when actuator 184 moves the covering fingers 182 away from the stack prior to returning to its starting location beneath the conveyor 12 in time to receive the next stack of patties from the lower support 22.

During the foregoing process, drive 36 rotates shaft 38 to move movable frame 30 along supports 34 on fixed frame 28 to position the movable frame portion 30 and hence the transfer mechanism 24 for optimal operation. As seen in FIG. 11, where stack 20 is transferred from the lower support 22 to the transfer mechanism 24, movable frame portion 30 is closest to fixed frame portion 30, and wheels 32 are positioned near the right edges of supports 34 as viewed in FIGS. 9–12. FIG. 9 shows the transfer mechanism 24 has moved to a point approximately halfway between the conveyor 12 and discharge location 228, and movable frame portion 30 has also moved in this direction as can be seen from the positions of wheels 32 on the supports. In FIG. 12, transfer mechanism 24 has reached discharge location 228, and the movable frame portion 30 has also moved closer to the discharge location as can be seen from the positions of wheels 32 on the supports 34. As discussed above, this motion provides for lengthening and shortening the conveyor as needed to vary the spacing between advancing rows of patties to give the upper support time to move into a stream of falling patties.

The subject invention has been described above in terms of a preferred embodiment. However, numerous obvious additions and modifications will become apparent to those skilled in the art upon a reading of the foregoing description. It is intended that all such additions and modifications form a part of the present invention to the extent that fall within the scope of the several claims appended hereto.

What is claimed is:

1. A system for forming a plurality of discrete objects into a stack comprising:

a frame having a top, a bottom and sides;

a conveyor associated with said frame and having an end edge for dispensing discrete objects;

a first support mounted on said frame near said end edge for receiving objects from said end edge and having an opening with a width smaller than the width of said objects;

a first actuator operably connected to said first support for moving said first support between first and second positions relative to said end edge;

a second actuator operably connected to said first support for moving said first support between upper and lower positions relative to said frame;

a second support mounted on said frame beneath said first support having a width less than the width of the opening in said first support;

a third actuator operatively connected to said second support for moving said second support between high and low positions, said second support high position being higher than said first support lower position;

a third support mounted on said frame at a position higher than said second support low position and having an opening wider than the width of said second support;

a fourth actuator operatively connected to said third support for moving said third support between a first position beneath said first support and a second position;

a sensor for determining the number of discrete objects in a stack, said sensor being operatively coupled to said to said third actuator; and a controller for controlling said first, second, third and fourth actuators.

2. The system of claim 1 including a first cam mounted on said frame and a drive for rotating said cam and wherein said first support includes a cam follower movable into engagement with said cam.

3. The system of claim 2 including a second cam mounted on said frame and operably connected to said drive wherein said second support includes a cam follower movable into engagement with said second cam.

4. The system of claim 3 wherein said third actuator urges said second support cam follower against said second cam.

5. The system of claim 2 wherein said second actuator urges said first support cam follower against said first cam.

6. The system of claim 2 wherein said sensor is operatively connected to said first cam.

7. The system of claim 1 wherein said first actuator is carried by said first support and moves with said first support as said first support moves between said upper and lower positions.

8. The system of claim 1 wherein said frame includes a first plate having a guide channel and an inner side and a second plate spaced from and parallel to said first plate, said second plate including a guide channel and an inner side facing said first plate inner side.

9. The system of claim 8 wherein said first plate guide channel comprises first and second parallel guide members mounted on said first plate inner side.

10. The system of claim 9 wherein said second plate guide channel comprises at least one slot in said second plate inner side.

11. The system of claim 8 wherein said first support includes a first guide wheel received in said first plate guide channel.

12. The system of claim 8 wherein said first support includes a first guide wheel received in said first plate guide and a second guide wheel received in said second guide plate channel.

13. The system of claim 8 wherein said first actuator is mounted on the side of said first plate opposite from said inner side.

14. The system of claim 1 wherein said frame includes a fixed portion fixed with respect to a support surface supporting said system and a movable portion movable with respect to said first portion.

15. The system of claim 14 wherein said conveyor is connected to both said fixed portion and said movable portion.

16. The system of claim 14 wherein said first support is mounted on said movable portion.

17. The system of claim 16 wherein said second support is mounted on said movable portion.

18. The system of claim 17 wherein said third support is mounted on said movable portion.

19. The system of claim 14 including an actuator operably coupled to said movable portion and the support surface for moving said movable portion with respect to said support surface.

20. The system of claim 1 wherein said first support comprises a translatable member and a pivotable member, said pivotable member being pivotably supported by said translatable member.

21. The system of claim 1 wherein said opening of said first support is defined by a pair of parallel pins extending from said first support.

22. The system of claim 21 wherein said opening of said first support is defined by a pair of parallel pins extending from said pivotable portion.

23. The system of claim 1 wherein said conveyor includes a generally horizontal upper surface and wherein said second support extends beneath said upper surface.

24. The system of claim 1 wherein said conveyor includes a generally horizontal upper surface and wherein said first support supports a stack of objects at least partially beneath said upper surface.

25. The system of claim 1 wherein said third support includes a floor portion for engaging a bottom of a stack and a wall portion for engaging a sidewall of a stack, wherein said third support opening is located in said floor portion.

26. The system of claim 1 wherein said third support includes a frame member and a tray member pivotably connected to said frame member.

27. The system of claim 26 wherein said third support includes a cover for covering one end of said tray.

28. The system of claim 27 including a fifth actuator for pivoting said tray member relative to said frame member and a sixth actuator for moving said cover relative to said tray.

29. The system of claim 28 wherein said fourth actuator is operative coupled to said third support frame member.

30. The system of claim 1 wherein said sensor is mounted on said frame adjacent the end edge of the conveyor.

31. A system for forming a plurality of discrete objects arranged in rows into a plurality of stacks comprising:

a frame having a top, a bottom, a first side having an inner wall and a second side having an inner wall facing said first side inner wall, said first side inner wall and said second side inner wall each including a guide track;

a first cam and a second cam mounted on said frame;

a drive for rotating said first cam and said second cam;

a conveyor associated with said frame and having an end edge for dispensing rows of discrete objects;

a first support mounted on said frame near said end edge, for receiving objects from said end edge, having a plurality of rods spaced by a distance less than the width of said objects, a guide wheel received in each of said guides on said frame first wall and said frame second wall, and a cam follower movable into engagement with said first cam;

a first actuator operably connected to said first support for moving said first support between first and second positions relative to said end edge;

a second actuator operably connected to said first support for moving said first support between upper and lower positions;

a second support mounted on said frame beneath said first support comprising a plurality of fingers each having a width less than the distance between said first support rods;

a third actuator operatively connected to said second support for moving said second support between high and low positions, said second support high position being higher than said first support lower position;

a third support mounted on said frame at a position higher than said second support low position comprising a frame portion and a tray portion, said tray portion including a bottom wall having a plurality of openings wider than the width of said fingers;

a fourth actuator operatively connected to said third support for moving said third support between a first position beneath said second support and a second position;

a sensor for counting the number of objects passing a point on said conveyor, said sensor being operatively connected to said drive for rotating said first cam and said second cam; and a controller for controlling said first, second, third and fourth actuators and said drive.

* * * * *